US006461662B2

United States Patent
Cain et al.

(10) Patent No.: US 6,461,662 B2
(45) Date of Patent: Oct. 8, 2002

(54) PALMITOLEIC ACID AND ITS USE IN FOODS

(75) Inventors: Frederick William Cain; Sietze Bouwer; Michel Henricus Wilhelmus van den Hoek; Andreas Menzel, all of Wormerveer (NL)

(73) Assignee: Unilever Patent Holdings BV, NLX (*) Notice: Subject to any disclaimer, the term of this patent is extended or adjusted under 35 U.S.C. 154(b) by 23 days.

(21) Appl. No.: 09/733,080

(22) Filed: Dec. 11, 2000

(65) Prior Publication Data

US 2001/0005519 A1 Jun. 28, 2001

(30) Foreign Application Priority Data

Dec. 10, 1999 (EP) ............................................ 99309998

(51) Int. Cl.$^7$ ................................................. A23D 9/00
(52) U.S. Cl. ........................ 426/606; 426/607; 435/134; 435/434
(58) Field of Search ................................ 426/601, 606, 426/607; 435/134, 434

(56) References Cited

U.S. PATENT DOCUMENTS

| | | | | |
|---|---|---|---|---|
| 4,675,132 A | * | 6/1987 | Stout et al. | 554/174 |
| 4,692,280 A | * | 9/1987 | Spinelli et al. | 554/205 |
| 4,792,418 A | * | 12/1988 | Rubin et al. | 435/134 |
| 5,198,250 A | * | 3/1993 | Brillhart et al. | 426/2 |
| 5,260,336 A | * | 11/1993 | Forse et al. | 514/549 |
| 5,897,994 A | * | 4/1999 | Sandoz et al. | 435/134 |
| 6,020,020 A | * | 2/2000 | Cain et al. | 424/523 |
| 6,183,796 B1 | * | 2/2001 | Brillhart | 426/417 |
| 6,344,574 B1 | * | 2/2002 | Foglia et al. | 426/417 |

FOREIGN PATENT DOCUMENTS

| | | | |
|---|---|---|---|
| DE | 0298293 B1 | * | 3/1994 |
| JP | 63-254989 | * | 10/1988 |
| JP | 0509792 | * | 4/1993 |
| WO | WO 97/19601 | | 6/1997 |

OTHER PUBLICATIONS

Cory, C. 1994. Macadamia nut oil. Inform 5:970.*
Cavaletto, C. G. et al. 1971. Factors Affecting Macadamia Nut Stability. J. Food Science 36:81.*
Hui, Y. H. (editor) 1996. Bailey's Industrial Oil and Fat Products, 5th edition, vol. 1, John Wiley & Sons, Inc. p. 458–459, 484–491.*
Toyoshima et al. 1993, Preparation of polyunsaturated triacylglycerols via transesterification catalyzed by immobilized lipase. J. of the Japan Oil Chemist' Society 42(1) 30–35 with translation.*
Patent Abstracts of Japan, vol. 018, No. 648 (1994) –JP 06 253872.
Patent Abstracts of Japan, vol. 013, No. 479 (1989) –JP 01 187089.

* cited by examiner

Primary Examiner—Carolyn Paden
(74) Attorney, Agent, or Firm—Morgan, Lewis & Bockius LLP

(57) ABSTRACT

Blends of glycerides and/or fatty acids comprising 20 to 65 wt % C16:1 fatty acid, balance other fatty acids with 12 to 24 C-atoms and having a C16:1 to C16:0 fatty acid ratio of more than 2.0 and an C16:1 to C18:1 fatty acid ratio of more than 1.2 perform well in food applications. These blends of glycerides can be made by a process involving a partial enzymic hydrolysis of materials derived from fish oil using an enzyme with specificity for C16:1, removal of the fatty acids and a fractionation of the acids.

19 Claims, No Drawings

PALMITOLEIC ACID AND ITS USE IN FOODS

BACKGROUND OF THE INVENTION

1. Field of the Invention

The invention is concerned with blends of glycerides and/or fatty acids, the use thereof in food applications and the preparation of such blends by partial enzyme hydrolysis.

2. Description of Related Art

Fats containing palmitoleic acid (=C16:1 fatty acid) are already known. In fact palmitoleic acid is a component in natural oils such as oils derived from macadamia nuts, which can contain up to 27 wt % of C16:1 fatty acid, but also oils like fish oil or seal blubber contain appreciable amounts of C16:1 fatty acid. As palmitoleic acid is considered to be a healthy oil component, that has health benefits such as antitumour activity (JP 59062523, Toyo Jozo Co Ltd), lowering serum cholesterol and LDL (Food Australia 1996, pp 216–222), and protective effect against ventricular arrhythmics as disclosed in U.S. Pat. No. 5,198,250 it would be highly appreciated if the fat containing the palmitoleic acid would be liquid at temperatures of 25° C. or lower. This would ease its use in capsules for encapsulated food ingredients or food supplements. Moreover liquid forms of fat are easier to dose in food compostions than solid fats. However most of the readily available fats known to contain appreciable amounts of C16:1 are solid at room temperature or lower and thus not very suitable for above purposes.

Moreover the known fats containing appreciable amounts of C16:1 also contain appreciable amounts of other fatty acids such as c16:0 and C18:1. It would be very beneficial if we could make available fats that combine high levels of C16:1 with relatively low levels of C16:0 and C18:1. This would improve the performance, such as opacity, pourability, viscosity, dosing, and blending of these fats considerably. An attempt to achieve this is disclosed in JP-laid open 01/187 089 (Shikibo Ltd). Herein a process is given wherein an oil, in particular macadamia oil is subjected to an enzymatic hydrolysis under conditions that result in complete hydrolysis, whereupon the fatty acids are collected in a fraction that is subjected to low temperature fractionation at about −20 to −25° C. It is indicated that the starting material must be selected in such a way that a separation can be obtained between the C16:1 and the other fatty acids during the low temperature fractionation. This limits the choice of starting materials considerably. This accounts the more as macadamia oil is a relatively rare and expensive oil. Further it would be very beneficial if the oil rich in C16:1 would also contain other healthy fatty acids, such as polyunsaturated fatty acids like EPA and DHA. We found eg that starting from a fish oil that contains more than 20 wt % C16:1, but also appreciable amounts of C16:0 and/or C18:1 it is very difficult to make an oil that contains simultaneously more than 20 wt % C16:1 and wherein the weight ratios C16:1 to C16:0 is more than 2 and the C16:1 to C18:1 weight ratio is more than 1.2 and that is essentially free of components such as cholesterol esters, normally present in fish oil under commercially acceptable process conditions. This can be attributed to the fact that during the low T-fractionation the separation of C16:0 and C18:1 from C16:1 is very difficult so that the oils resulting will have about the same weight ratios C16:1 to C16:0 and C16:1 to C18:1 as the starting material, unless very severe separation conditions are applied.

SUMMARY OF THE INVENTION

Therefore we studied whether we could develop a process that would result in a fat relatively rich in C16:1 and relatively lean in C16:0 and/or C18:1 and that would contain polyunsaturated fatty acids and that would be liquid at ambient temperature and lower. This study resulted in the finding of novel fat compositions that meet these aims and in a novel process to make such fat compositions.

Therefore our invention concerns in the first instance a blend of glycerides and /or fatty acids comprising:

i) 20–65 wt %, preferably 25–55 wt %, most preferably 30–45 wt % C16:1 fatty acid
ii) at least 2% (DHA plus EPA)
iii) balance other fatty acids with 12 to 24 C-atoms, including C16:0 and C18:1 while the C16:1/C16:0 weight ratio in the blend is greater than 2.0, preferably greater than 4.0 and its C16:1 to C18:1 weight ratio is more than 1.2, preferably more than 2 most preferably more than 2.5

DHA being the C22:6 polyunsaturated fatty acid and EPA being the C20:5 polyunsaturated fatty acid.

It was found that these blends have very beneficial product properties if the blend displayed an N10 (solid fat content measured by NMR pulse on non stabilised fat at 10 oC) of less than 10, preferably less than 8 most preferably less than 5. Because of this N-value these fats can be used beneficially in compounds wherein a liquid form of a fat is an advantage such as in food supplements. It was found that the best product properties were obtained if the blend contained a limited amount of C16:0 and C18:1 fatty acid, in particular when the amount of C18:1 ranged from 5–50 wt %, preferably 8 to 30 wt % the products performed very well.

DETAILED DESCRIPTION OF THE INVENTION

The health benefits of our new blends are improved because of the presence of a certain amount of essential fatty acids such as DHA and/or EPA, this will add the health benefits of these acids to the blend. However these acids are very soft (liquid) and thus it should have been expected that the performance of fats containing these fatty acids as well would be less than for the oils without these essential fatty acids. However we found that blends containing more than 2 wt % and even more than 4 wt % of these highly unsaturated essential fatty acids still performed well, even the oxygen sensitivity of such blends was acceptable for practical purposes. It was found that the presence of amounts of more than 15 wt % of these polyunsaturated fatty acids leads to products that could not be handled anymore because of the fact that they developed an off taste already after only a few days. Blends that can contain our high levels of C16:1 in combination with the required levels of DHA and/or EPA can be derived from fish oils. To obtain such blends an oil containing a certain minimum amount of C16:1 such as fish oil has to be processed in a specific way. This specific process is another embodiment of our invention. Therefore our invention also concerns a process for making the blends or compositions according to the invention involving the following steps:

i) Hydrolysing an oil derived from fish oil that is relatively rich in C16:1 using an enzyme that is selective for C16:1 under conditions resulting in a hydrolysis level that is maximum 80%, preferably maximum 60%, most preferably maximum 40%
ii) Removal of the fatty acids from the hydrolysis reaction product
iii) Fractionation of the acids using solvent or dry fractionation techniques iv) optionally esterification of the fatty acids via an enzyme treatment to give a glyceride mixture Because of the fact that we use an enzyme with specificity for C16:1 fatty acids and we perform an incomplete hydrolysis we achieve an enrichment in C16:1 over the other fatty acids present in the starting material, including the C16:0 and C18:1 fatty acids.

In this way we can avoid the application of a low T-fractionation which would lead to a process that would have little commercial applicability.

Suitable conditions for the enzymic hydrolysis are:

Weight ratio enzyme to oil 0.001 to 0.2, preferably 0.002 to 0.05.

Amount of water 10–50% on oil, preferably 30 to 50%

Temperatures 20 to 50° C., preferably 25 to 35° C.

Residence times of 0.5 to 48 hours, preferably 8 to 24 hrs.

In above process the enzymes are lipases which are derived from microorganisms selected from the group consisting of Candida sp., Geotrichum sp., Rhizomucor sp., or Pseudomonas sp.

The liberated fatty acids can be separated from the rest of the reaction mixture by molecular destillation, solvent or dry fractionation.

During the fractionation the following conditions can be used:

1. for dry fractionation: Cooling down of the fatty acids to a temperature where 20–40% of the fatty acids crystallize (depending on N value of the composition between 10 and 35° C.) and subsequent filtration at 5 to 50 bar. This procedure has to be repeated once or twice.
2. for wet fractionation: A warm (40–50° C.) mixture of fatty acids and 50–400 vol % solvent is cooled down very slowly to −10 to 20° C. Crystals are removed by filtration. The filtrate is concentrated.

Solvents that can be applied are: acetone, hexane, petroleum ethers, and ethanol.

Our blends with relatively high C16:1 contents can also be used for food applications. Herefore it is beneficial to blend our blends with other so called complementary fats. Therefore part of our invention is also a blend of glycerides and/or free fatty acids comprising: 0.3–95 wt % of the blends according to our first invention, defined above or made by the process according to our invention and 99.7–5 wt % of a complementary fat, having a solid fat index at 10° C. that is at least 5% more, than the $N_{10}$ of the blend according to our first invention.

These blends comprise in particular 2–80 wt %, more particular 5–40 wt % of the blend according to our invention, and 98–20 wt %, in particular 95-60 wt % of the complementary fat.

The complemenatry fats that perform best have a solid fat content (NMR pulse; not stabilised) of more than 15 at 20 oC, preferably more than 20.

Examples of suitable complementary fats are: cocoa butter equivalents, cocoa butter, palm oil or fractions thereof, palm kernel oil or fractions thereof, interesterified mixtures of above fats or fractions or hardened components thereof, or from liquid oil, such as sunflower oil, high oleic sunflower oil, soybean oil, rape seed oil, cottonseed oil, safflower oil, high oleic safflower oil, maize oil or MCT oils, hardened liquid oils or fractions thereof or mixtures of one or more of the fats or oils mentioned. These blends display solid fat contents (NMR-pulse; not stabilised) of 0–85%, preferably 10–70%, most preferably 20–60% at 5° C. and <30, preferably <20, most preferably <5 at 35° C.

In order to stabilise the fat composition further we prefer that our blends contain between 0.01 and 5% preferably 0.1 and 3% of an oxidation stabiliser, selected from the group consisting of: natural or synthetic tocopherols, BHT, BHA, free radical scavengers, enzymes with anti-oxidant properties.

According to another embodiment of our invention our invention also comprises food products, comprising a fat phase, such as spreads, margarine, cream alternative, infant food, chocolate, confectionery, bakery products, sauces, ice-creams, ice-cream coatings, cheese, soups, mayonnaise, dressings, wherein the fat phase contains a blend according to the invention.

Also capsules comprising a filling, encapsulated in an edible coating, wherein the filling consists of the blend according to our invention are part of our invention.

EXAMPLES

1. PREPARATIONS OF C16:1 RICH OIL

A)

10 kg of Menhaden fish oil with the composition mentioned in table 1 were subjected to an enzymatic hydrolysis using *Candida rugosa* lipase (0.02% on fish oil) in 5 kg of water. The hydrolysis was performed under nitrogen at 30° C. for 20 hours. This resulted in a hydrolysis that was 45.5% of the total conversion rate.

The crude product obtained was heated to 80° C. and washed twice with 3 l water and the free fatty acids were purified by distillation.

The product obtained had the composition as given in table 2 (a). This product was fractionated using acetone (weight ratio fatty acids to acetone=1 to 2, fractionation temperature 0° C.). The solvent fraction was collected and had the composition mentioned in table 2 (b). The yield was 20% on starting oil (N10=7.6).

B)

10 kg of Menhaden fish oil with the composition mentioned in table 1 were subjected to an enzymatic hydrolysis using *Candida rugosa* lipase (0.003% on fish oil) in 5 kg of water. The hydrolysis was performed under nitrogen at 30° C. for 23 hours. This resulted in a hydrolysis that was 22% of the total conversion rate.

Further workup and fractionation was as above. The composition of these acids is given in table 2 [(c) after hydrolysis, (d) after fractionation]. The yield was 10% on starting oil (N10=6.2).

C)

Repeating the procedure of example 1B but using macademia oil as starting material and applying a conversion rate of about 30% (0.003% of lipase; T=30° C.; time=26 hrs) resulted in a product with 30% FFA's, containing 6.4% C16:0; 34.1% C16:1 and 53.6% C18:1. Fractionation of this product under the condition of ex 1B resulted in a product with a C16:1 to C18:1 ratio of more than 1.2 that could not be applied properly.

2. REESTERIFICATIONS OF C16:1 RICH OIL

A 629 g of fatty acids of example 1.A [composition see table 2 (b)] and 75.3 g glycerol were subjected to an enzymatic esterification using immobilized *Rhizomucor miehei* lipase (2% on fatty acids, Amano SP392). The esterification was performed under a nitrogen stream (to remove the water) at 60° C. for 4 d. This resulted in a esterification with 0.8% fatty acids left. The enzyme was filtrated off. The yield was 89% on starting fatty acids (N10=3.1). The composition is given in table 3 (a).

B)

741 g of fatty acids of example 1.B [composition see table 2 (d)] and 88.8 g glycerol were subjected to an enzymatic esterification using immobilized *Rhizomucor miehei* lipase (5% on fatty acids, Amano SP392). The esterification was performed under a nitrogen stream (to remove the water) at 60° C. for 2 d. This resulted in a esterification with 0.5% fatty acids left. The enzyme was filtrated off. The yield was 94% on starting fatty acids (N10=1.6). The composition is given in table 3 (b).

TABLE 1

| Fatty Acids | Crude Menhaden Oil |
|---|---|
| 16:4ω3 | 0.9 |
| 18:3ω3 | 1.1 |
| 18:4ω3 | 2.5 |
| 20:3ω3 | 0.0 |
| 20:4ω3 | 1.3 |
| 20:5ω3 | 12.1 |
| 21:5ω3 | 0.7 |
| 22:4ω3 | 0.1 |
| 22:5ω3 | 2.3 |
| 22:6ω3 | 7.7 |
| C12:0 | 0.1 |
| C15:0 | 0.7 |
| C14:0 | 8.9 |
| C14:1 | 0.1 |
| C16:0 | 19.8 |
| C16:1 | 12.5 |
| C17:0 | 0.5 |
| C18:0 | 3.2 |
| C18:1 | 9.2 |
| C18:2 | 1.1 |
| C18:3 | 0.2 |
| C20:0 | 0.2 |
| C20:3 | 0.3 |
| C20:4 | 1.4 |
| C20:1 | 1.0 |
| C20:2 | 0.2 |
| C22:0 | 0.2 |
| C22:1 | 0.2 |
| C24:0 | 0.1 |
| C24:1 | 0.2 |
| Others | 11.2 |

TABLE 2

| | Example 1A | | Example 1B | |
|---|---|---|---|---|
| Fatty Acids | (a) FFA after distillation | (b) FFA after fractionation | (c) FFA after distillation | (d) FFA after fractionation |
| 16:4ω3 | 0.4 | 0.6 | 0.4 | 0.5 |
| 18:3ω3 | 1.5 | 2.2 | 2.0 | 2.6 |
| 18:4ω3 | 0.9 | 1.3 | 0.7 | 0.7 |
| 20:3ω3 | 0.1 | 0.1 | 0.1 | 0.1 |
| 20:4ω3 | 0.5 | 0.7 | 0.3 | 0.3 |
| 20:5ω3 | 3.8 | 5.7 | 3.0 | 2.7 |
| 21:5ω3 | 0.1 | 0.2 | 0.1 | 0.1 |
| 22:4ω3 | 0.0 | 0.0 | 0.0 | 0.0 |
| 22:5ω3 | 0.3 | 0.5 | 0.4 | 0.4 |
| 22:6ω3 | 0.8 | 1.3 | 1.3 | 1.0 |
| C12:0 | 0.2 | 0.3 | 0.2 | 0.3 |
| C15:0 | 1.0 | 0.8 | 0.8 | 0.7 |
| C14:0 | 12.8 | 14.4 | 10.7 | 12.3 |
| C14:1 | 0.1 | 0.1 | 0.1 | 0.2 |
| C16:0 | 29.8 | 6.6 | 24.4 | 6.3 |
| C16:1 | 20.6 | 30.5 | 30.0 | 41.7 |
| C17:0 | 0.6 | 0.4 | 0.5 | 0.3 |
| C18:0 | 2.9 | 1.1 | 1.7 | 0.9 |
| C18:1 | 11.9 | 17.5 | 10.7 | 13.4 |
| C18:2 | 1.6 | 2.2 | 1.6 | 2.1 |
| C18:3 | 0.1 | 0.1 | 0.1 | 0.1 |
| C20:0 | 0.1 | 0.1 | 0.1 | 0.1 |
| C20:3 | 0.0 | 0.1 | 0.1 | 0.1 |
| C20:4 | 0.4 | 0.6 | 0.3 | 0.3 |
| C20:1 | 0.4 | 0.6 | 0.2 | 0.2 |
| C20:2 | 0.1 | 0.1 | 0.0 | 0.1 |
| C22:0 | 0.0 | 0.0 | 0.0 | 0.0 |

TABLE 2-continued

| | Example 1A | | Example 1B | |
|---|---|---|---|---|
| Fatty Acids | (a) FFA after distillation | (b) FFA after fractionation | (c) FFA after distillation | (d) FFA after fractionation |
| C22:1 | 0.0 | 0.0 | 0.1 | 0.0 |
| C24:0 | 0.0 | 0.0 | 0.0 | 0.0 |
| C24:1 | 0.1 | 0.1 | 0.0 | 0.0 |
| Others | 8.9 | 11.8 | 10.1 | 12.5 |

TABLE 3

| Fatty Acids | (a) Glycerides of Example 2A | (b) Glycerides of Example 2B |
|---|---|---|
| 16:4ω3 | 0.7 | 0.4 |
| 18:3ω3 | 2.2 | 2.6 |
| 18:4ω3 | 1.3 | 0.7 |
| 20:3ω3 | 0.1 | 0.1 |
| 20:4ω3 | 0.7 | 0.3 |
| 20:5ω3 | 6.0 | 2.7 |
| 21:5ω3 | 0.2 | 0.1 |
| 22:4ω3 | 0.0 | 0.0 |
| 22:5ω3 | 0.6 | 0.3 |
| 22:6ω3 | 1.3 | 1.0 |
| C12:0 | 0.3 | 0.3 |
| C15:0 | 0.8 | 0.7 |
| C14:0 | 14.0 | 12.2 |
| C14:1 | 0.2 | 0.2 |
| C16:0 | 6.5 | 6.3 |
| C16:1 | 30.0 | 41.9 |
| C17:0 | 0.3 | 0.3 |
| C18:0 | 1.1 | 0.9 |
| C18:1 | 17.5 | 13.5 |
| C18:2 | 2.2 | 2.1 |
| C18:3 | 0.1 | 0.1 |
| C20:0 | 0.1 | 0.0 |
| C20:3 | 0.1 | 0.1 |
| C20:4 | 0.5 | 0.3 |
| C20:1 | 0.6 | 0.2 |
| C20:2 | 0.1 | 0.1 |
| C22:0 | 0.0 | 0.0 |
| C22:1 | 0.0 | 0.0 |
| C24:0 | 0.0 | 0.0 |
| C24:1 | 0.1 | 0.0 |
| Others | 12.4 | 12.6 |

What is claimed is:

1. A blend of glycerides and/or fatty acids comprising:
   i) 20–65 wt %, of C16:1 fatty acid
   ii) at least 2% (DHA plus EPA)
   iii) balance other fatty acids with 12 to 24 C-atoms, including C16:0 and C18:0
   iv) while the C16:1/C16:0 weight ratio in the blend is greater than 2.0
   v) and its weight ratio C16:1 to C18:1 is more than 1.2.

2. Blend according to claim 1, wherein the blend displays an N10 (solid fat content measured by NMR pulse on non stabilised fat at 10° C.) of less than 10.

3. Blend according to claim 1, wherein the blend has an C18:1 content of 5 to 50 wt %.

4. Blend according to claim 1 which blend is derived from a fish oil.

5. A process for making the composition according to claim 1 which comprises the following steps:
   i) hydrolysing a material derived from fish oil, relatively rich in C16:1 using an enzyme that is selective for C16:1 to a maximum hydrolysis level of 80%,
   ii) removal of the fatty acids from the hydrolysis reaction product iii) fractionation of the acids using solvent or dry fractionation techniques, and iv) optionally esterification of the fatty acids via an enzyme treatment to give a glyceride mixture.

6. Process according to claim 5, wherein the enzyme is from a microorganism selected from the group consisting of Candida sp., Geotrichum sp., Rhizomucor sp., and Pseudomonas sp.

7. A process according to claim 5 wherein the maximum hydrolysis level is 60%.

8. A process according to claim 5 wherein the maximum hydrolysis level is 40%.

9. Blends of glycerides and/or free fatty acids comprising:

0.3–95 wt % of the blends made by the process of claim 5 and 99.7–5wt % of a complementary fat, having an $N_{10}$ representing a solid fat index at 10° C. that is at least 5% more, than the $N_{10}$ of the blend.

10. Blends of glycerides and/or free fatty acids comprising:

0.3–95 wt % of the blends according to claim 1 and 99.7–5 wt % of a complementary fat, having an $N_{10}$ representing a solid fat index at 10° C. that is at least 5% more, than the $N_{10}$ of the blend.

11. Blends of glycerides and/or free fatty acids, according to claim 17, comprising 2–80 wt % of the blend and 90–20 wt % of a complementary fat.

12. Blends according to claims 10, wherein the complementary fat has a solid fat content (NMR-pulse; not stabilised) of more than 15 at 20 C.

13. Blends according to claim 10, wherein the complementary fat is selected from at least one fat of the group consisting of: cocoa butter equivalents, cocoa butter, palm oil or fractions thereof, palm kernel oil or fractions thereof, interesterified mixtures of above fats or fractions or hardened components thereof, or from liquid oil, such as sunflower oil, high oleic sunflower oil, soybean oil, rape seed oil, cottonseed oil, safflower oil, high oleic safflower oil, maize oil and MCT oils, hardened liquid oils and fractions thereof and mixtures of one or more of the fats or oils mentioned.

14. Blends according to claim 10, wherein the blend displays a solid fat content (NMR-pulse; not stabilised) of 0–85 at 5° C. and <30 at 35° C.

15. Blends, according to claim 1, wherein the blends contain between 0.01 and 5% of an oxidation stabiliser, selected from the group consisting of: natural or synthetic tocopherols, BHT, BHA, free radical scavengers, enzymes with anti-oxidant properties.

16. Blends according to claim 15 which contain between 0.1 and 3% of said oxidation stabiliser.

17. Food products, comprising a fat phase wherein the fat phase contains a blend according to claim 1.

18. Food products according to claim 17 selected from the group consisting of spreads, margarine, cream alternative, infant food, chocolate, confectionery, bakery products, sauces, ice-creams, ice-cream coatings, cheese, soups, mayonnaise, dressings.

19. Capsules comprise a filling, encapsulated in an edible coating, wherein the filling consists of the blend according to claim 1.

* * * * *